May 9, 1961 R. J. REID ET AL 2,983,699
COMPOSITION FOR AND METHOD OF PRODUCING MOLDS
Filed May 20, 1957
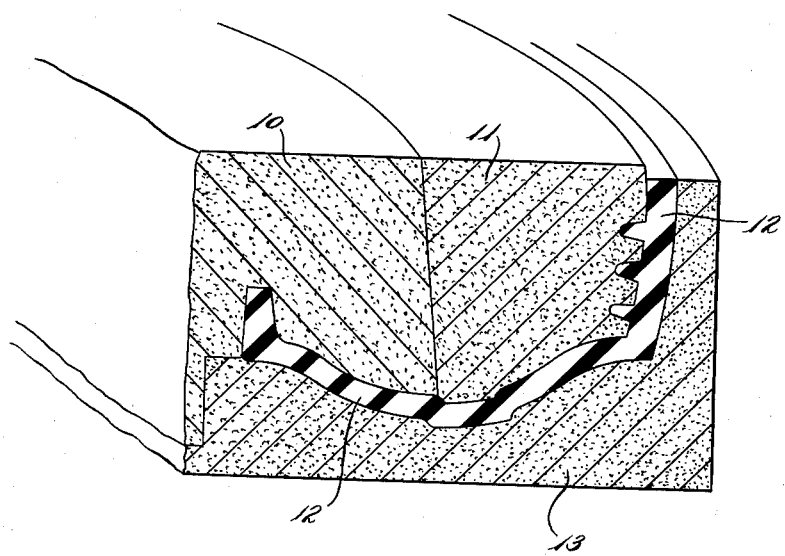
INVENTORS
ROBERT J. REID
BY OTIS D. COLE
W. A. Fraser
ATTY.

United States Patent Office 2,983,699
Patented May 9, 1961

2,983,699

COMPOSITION FOR AND METHOD OF PRODUCING MOLDS

Robert J. Reid, Canal Fulton, and Otis D. Cole, Akron, Ohio, assignors to The Firestone Tire & Rubber Company, Akron, Ohio, a corporation of Ohio Filed May 20, 1957, Ser. No. 660,331

8 Claims. (Cl. 260—41.5)

This invention relates to the production of molds and, more particularly, to a composition for and a method of producing molds for curing rubber articles.

In the manufacture of metal molds for use in the production of rubber articles carrying relief pattern, and particularly in the manufacture of metal molds for the production of pneumatic rubber tires, a process of precision molding is commonly employed. This process consists of (a) making a positive model, usually of plaster, of a segment of the tire tread desired, (b) making a flexible negative mat of the positive model, (c) adhering a rigid backing structure to the back surface of the mat, (d) stripping the flexible negative mat from the positive model of step (a), (e) employing the flexible mat in making a hard, ceramic-like positive mold core, and (f) employing the required number of positive core segments to cast a full circle metal mold half for the tire. Any number of the desired rubber tires may be produced by repeatedly vulcanizing green tires within the complete mold.

The positive plaster model of step (a) is prepared in a manner well known in the plaster art; it is to be understood that the model can also be made of wood, metal, cured epoxy of phenolic resins or any other material which will not deform when subjected to the curing temperature of the flexible mat material. The flexible negative mat of step (b) is made by casting about the positive pattern or model of step (a), a material which hardens sufficiently to retain the tire tread details and yet remains flexible and strong enough to permit it to be stripped from the model and later to be repeatedly stripped from the positive ceramic mold core of step (e) and reused in producing additional mold cores. The so-called Shaw process relates to the production of the hard mold core from a slurry of ethyl silicate, methyl or ethyl alcohol, and a fine refractory sand along with a small quantity of water, hydrochloric acid and piperidine. The quantities of materials used, and the method of mixing and molding are well known to those skilled in the art. Likewise, the method of casting the metal negative mold of step (f) is well known in the mold manufacturing art.

A variety of materials have been employed in producing the intermediate flexible mat. To date the most commonly employed and most successful materials have been the polyvinyl chloride plastisols and "Thiokol" liquid polymers [1]. However, all of the previously used materials have been characterized by several serious limitations. Many of the otherwise satisfactory materials, including the vinyls and the Thiokol polymers, lack dimensional stability after only limited use in the Shaw molding operation. Moreover, the alcohol in the ethyl silicate slurry and that produced in situ by hydrolysis of the silicate adversely affects most flexible mold materials presently used. Specifically, when exposed to methyl or ethyl alcohol molds formed from plastisols (plasticized polyvinyl chlorides) become hard and stiff and are easily torn or cracked. On the other hand, molds formed from the cured Thiokol polymers shrink when contacted with methanol and ethanol to the point where desired irregularities of the mold, such as serrated ribs and the like, become straight. Flexible molds which become torn or which are dimensionally unstable produce improperly formed cores which result in defective negative metal molds and ultimately in imperfectly formed rubber articles. This is particularly serious where the ultimate rubber commodity is a precision article such as an automobile tire.

In view of these and other difficulties attending the production and use of flexible molds in the Shaw process, it has been possible to use such prior art mats only a few times before deterioration causes them to produce an inferior product. Production costs thus have been undesirably high.

In view of the foregoing and other difficulties, an object of the present invention is to provide a composition which is moldable and rapidly curable to form a flexible and durable pattern structure characterized by greatly enhanced durability, dimensional stability, and resistance to attack by alcohols.

Another object of the invention is to provide a flexible, dimensionally stable, tear resistant vulcanizate, such as a mat structure operable accurately to reproduce form and dimensions through a large number of casting operations.

A further object of the present invention is to provide a method of making a flexible mat structure operable to reproduce form and dimensions accurately in a large number of casting operations, without cracking, tearing or loss in dimensional stability.

A further object of this invention is to provide a method of producing a metal tire mold, wherein the intermediate mat is composed of a material which is flexible, resilient, tear resistant, and dimensionally stable.

A still further object of this invention is to provide a method of making a model from a negative pattern or mat.

The above and additional objects are attained by the present invention. In accordance with the invention it has been determined that durable, flexible mats of greatly enhanced structural stability are formed by curing a pourable composition comprising depolymerized rubber, a vulcanizing agent, vulcanization accelerator, and an activator therefor.

The invention includes a method of making a flexible, resilient, dimensionally stable negative mat structure suitable for repeated use in the production of mold cores and also of plaster or plastic models, which comprises forming a positive model of the desired flexible negative pattern, casting about said model a composition comprising depolymerized rubber and a vulcanizing agent, and curing said composition to form a vulcanizate. The mat structure of the invention and its formation are illustrated in the single figure of the accompanying drawing, in which a two-part model 10, 11 and a shell structure 13 provide a mold cavity which is filled by the liquid rubber composition of the invention to provide upon vulcanization thereof a mat 12 carrying on its inner surface a negative design of the exterior surface of model 10, 11.

Also embraced by the present invention is a method of making a metallic mold for use in the production of rubber articles with a relief design thereon which comprises forming a positive model of the desired rubber article, casting about said model a composition comprising depolymerized rubber and a vulcanizing agent, curing said composition to form a flexible vulcanizate mat carrying a negative pattern of the relief design, stripping the vulcanized mat from the model, forming a hard ceramic core against the pliable, resilient mat, stripping the pliable,

[1] Produced by Thiokol Chemical Corp.

resilient mat from the core, and casting a metal about the core.

The present invention also includes a method of making a rubber article carrying a relief design, which comprises forming a model of the desired rubber article, casting about the model a composition comprising depolymerized rubber and a vulcanizing agent, curing said composition to form a vulcanizate mat carrying a negative pattern of the relief design, stripping said vulcanized mat from the model, forming a hard ceramic core against the mat, stripping the vulcanized mat from the core, casting a metal about the core to form a metal mold having the desired pattern in reverse thereon, and finally pressing and curing the rubber article against the metal mold.

It has been discovered that a special, fast curing depolymerized rubber composition possesses characteristics making it particularly suitable for producing an intermediate flexible mat useful in the Shaw process for the production of the metal molds for the manufacture of molded rubber articles with relief patterns thereon, such as rubber tires.

It further has been discovered that a pattern comprising a vulcanized depolymerized rubber may be repeatedly reused in the production of molds without any of the difficulties attending use of the prior art mats formed from vinyl composition and Thiokol polymers. The vulcanized mats according to the invention are pliable, resilient and dimensionally stable and may be repeatedly used without losing size or shape or without distortion of the design. These mats are resistant to alcohol used in the production of ethyl silicate-sand cores by the Shaw process. After repeated contact with the core composition and alcohol contained therein, a vulcanized depolymerized rubber mat remains soft and pliable and retains its original dimensions. The mats of the invention exhibit greatly improved resistance to tearing, cracking or checking when subjected to the abuse inherent in repeated stripping operations, even when undercut designs are employed.

Depolymerized rubber is made from rubber having an essentially cis-1,4-polyisoprene structure, i.e., a crude natural or "synthetic natural rubber." Depolymerized rubber is prepared by heating crude rubber, vulcanized natural rubber, reclaimed natural rubber, or "synthetic natural rubber" to a temperature causing melting and conversion of the rubber to a form that remains flowable after cooling to ordinary temperatures. Natural or "synthetic natural" rubber compositions may be suitably depolymerized by heating at a temperature of approximately 270–300° C., and preferably at about 290° C., for a period of from two to six hours. Unvulcanized depolymerized natural rubber suitable for use in this invention is produced commercially by D.P.R., Inc., Belleville, New Jersey. Depolymerized rubber is commercially available in viscosities ranging from about 8,000 centipoises (5,000 molecular weight) to about 75,000 centipoises (11,000 molecular weight) as determined by the Brookfield Syncro-Lectric viscosimeter at 150° F. While the lower viscosity types are preferred because of their greater flowability, any depolymerized rubber flowable at curing temperature or below may be satisfactorily employed.

The so-called "synthetic natural rubbers" which are operable in the present invention are high cis-1,4-polyisoprenes which may be produced by polymerization of isoprene in the presence of a lithium containing catalyst or a Ziegler-type catalyst such as a complex of titanium tetrachloride and an alkyl aluminum. The resulting polymers may be depolymerized in the same manner as natural rubber and employed in preparation of the flexible molds of the invention. A more complete description of these polyisoprenes may be found in articles by F. W. Stavely et al., Industrial and Engineering Chemistry, vol. 48, pp. 778–783 (April 1956), and by S. E. Horne, Jr., et al., ibid., vol. 48, pp. 784–791.

Molding compositions according to the invention preferably comprise depolymerized rubber, a semi-reinforcing agent or pigment, a metallic oxide, an antioxidant, a curing agent and an accelerator.

The preferred curing or vulcanizing agent is elemental sulfur, and it is preferably incorporated in quantities ranging between about 0.5 and about 10 parts by weight per 100 parts depolymerized rubber. Use of less than 0.5 part sulfur generally produces a vulcanizate of insufficient tensile strength, whereas the use of greater than about 10 parts sulfur results in a semi-hard material of inadequate flexibility. Especially preferred as the vulcanizing agent of the invention is elemental sulfur in an amount between about 1.0 and about 2.0 parts by weight per 100 parts depolymerized rubber. Other vulcanizing agents which may be successively employed in practicing the invention are sulfur donors, comprising the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Vulcanizing agents other than free sulfur are employed in an amount sufficient to produce a cure equivalent to that produced by incorporation in the mix of from about 0.5 to about 10 parts of elemental sulfur.

Various finely divided metallic oxides may be added prior to vulcanizing depolymerized rubber to assist in curing the rubber. Operable metallic oxides include, without limitation, zinc oxide, calcium oxide, magnesium oxide, iron oxide and lead oxide. The metal oxides are also of assistance as reinforcing agents or fillers and serve as pigments where a light-colored vulcanizate is desired. The metallic oxides are preferably employed in a quantity ranging between about 1 and about 20 parts by weight per 100 parts of depolymerized rubber. Incorporation of from about 5 to about 15 parts of zinc oxide is especially preferred. Conventional fillers and reinforcing agents known to the rubber compounding art may be employed in the compositions of the invention. These include, without limitation, the above listed metal oxides, silicon dioxide, including the hydrated variety; slate flour, litharge, whiting, and carbon blacks, including those made by the channel process as well as the various furnace blacks. Care should be exercised to use only small proportions of reinforcing carbon blacks because of their tendency to thicken the depolymerized rubber composition to the extent that it may not readily flow during the molding process; for example, 20 parts of easy processing channel black stiffened the rubber composition so that it could not be poured, and a similar result was obtained by the use of 40 parts of "P–33"[2] black. Soft "semi-reinforcing" carbon black and silicon dioxide are the preferred reinforcing agents. Of the available silicon dioxides, that sold under the trademark "Hi-Sil"[3] has been found suitable. Mixtures of the oxides and blacks may be employed. An especially desirable mixture is produced by admixture of from about 5 to about 10 parts of zinc oxide with from about 35 to about 45 parts of non-reinforcing or semi-reinforcing carbon black per 100 parts of depolymerized rubber.

The amount of pigment in addition to zinc oxide incorporated in the compositions of the invention is desirably varied in accordance with the properties desired in both the unvulcanized mix and the cured product. In general it is preferred to employ at least 5 parts pigment per 100 parts of depolymerized rubber with a desired upper limit of about 75 parts. In the case of the silicas a range of from about 5 to about 20% is preferred. Use of more than about 20 parts of these materials renders

---

[2] A soft "reinforcing" gas black of the fine thermal type, sold by R. T. Vanderbilt Company.

[3] A hydrated silicon dioxide sold by the Columbia Southern Chemical Company, a division of the Pittsburgh Plate Glass Company.

the composition undesirably stiff and thus pourable with difficulty. However, non-reinforcing or semi-reinforcing blacks may be employed in greater proportions because of their greatly reduced thickening effect; these blacks are preferably incorporated in the range of from about 5 to about 75 parts by weight per 100 parts of depolymerized rubber. In general, the amount of reinforcing agent employed will be varied depending on the known ability of the agent to stiffen unvulcanized rubber compounds and its effect on the tensile strength of such compositions.

Among the conventional accelerators which may be employed to cure the compositions of the invention are mercaptobenzothiazole and its derivatives; tetramethyl thiuram disulfide and other known thiuram sulfide accelerators; the salts of dithiocarbamic acid such as zinc dimethyl dithiocarbamate, zinc diethyl dithiocarbamate, zinc dibutyl dithiocarbamate, zinc-N-pentamethylene dithiocarbamate, 2,4-dinitro-phenyl dimethyl dithiocarbamate, piperidinium pentamethylene dithiocarbamate and selenium diethyl dithiocarbamate. While operable, these conventional accelerators alone are characterized by a slowness of action which may be undesirable in some commercial operations.

It has been discovered, however, that superior results are obtained, both in terms of end product and speed of cure, when an activated dithiocarbamate is employed as an accelerator. Dithiocarbamates, such as those listed above and mixtures thereof, are suitably activated, for example, by reaction with or admixture with a free aliphatic or cycloaliphatic amine such as diethylamine, cyclohexylethyl amine, tetraethylene pentamine, the mono-, di-, or tri-ethanolamines and the like. These amines can be further activated and also stabilized by reaction with carbon disulfide. A preferred activated dithiocarbamate accelerator is sold by R. T. Vanderbilt Company under the trade name Butyl Eight.

Very effective accelerators are also obtained by admixing the activated dithiocarbamates with xanthates such as zinc methyl xanthate, zinc ethyl xanthate, zinc butyl xanthate and zinc propyl xanthate; or with the zinc salts of the various dithiocarbamic acids such as zinc dimethyl dithiocarbamate, zinc diethyl dithiocarbamate, zinc diethyl dithiocarbamate, zinc dibutyl dithiocarbamate, and the like. Used alone, these additives are not sufficiently fast in their action but react synergistically with the activated dithiocarbamates to effect rapid cures.

The accelerator is employed in a quantity ranging from about 1 to about 8 parts by weight per 100 parts of depolymerized rubber. Between about 2 and about 5 parts of accelerator is preferred.

Between about 0.5 and about 5.0 parts, and preferably between about 1 and about 2.5 parts of any suitable rubber antioxidant is desirably incorporated in the depolymerized rubber composition. Antioxidants which can be employed include, without limitation, 2,2'-methylene bis-6-t-butyl-4-methylphenol, phenyl betanaphthylamine, phenyl alphanaphthylamine, aldol alphanathylamine, diphenylamine-acetone reaction products; or the various known condensation products of acetone and para-substituted anilines, e.g., 2,2,4-trimethyl-6-dodecyl-1,2-dihydroquinoline and 2,2,4-trimethyl-6-ethoxy-1,2-dihydroquinoline.

Having generally described the invention, the following examples are presented for purposes of illustrating the various embodiments thereof. Unless otherwise indicated, all parts are parts by weight based on 100 parts of depolymerized rubber.

Example 1

A depolymerized rubber composition was produced using as a recipe:

| | Parts |
|---|---|
| Low viscosity depolymerized rubber | 100 |
| Carbon black (Thermax[4]) | 40 |
| Zinc oxide | 10 |
| Sulfur | 1.5 |
| Antioxidant (2,2'-methylene bis-6-t-butyl-4-methylphenol) | 1 |
| Accelerator (Butyl Eight) | 4 |

[4] A soft, semi-reinforcing, medium thermal, gas carbon black sold by R. T. Vanderbilt Company.

The following mixing procedure was employed: The sulfur, zinc oxide and antioxidant were blended in the dry state. The blended pigments, the carbon black and about one-sixth of the depolymerized rubber were placed in a mixer and blended until smooth, about 15 minutes. A second one-sixth portion of the liquid rubber was added and blended with the mix. A third one-sixth portion of the liquid rubber was then added and blended with the previous mix. Then the remainder of the depolymerized rubber was added and blended thoroughly with the mix, this step consuming about 30 minutes. The liquid mix was stored at room temperature or below until used.

The pourable rubber composition, so produced, was prepared for curing by mixing in the accelerator in accordance with the above recipe. The stock was degassed by applying a vacuum during the final mixing stage. A plaster model of a tire tread segment was assembled with ends, gate and riser to provide a mold assembly, and proper vents were also provided. The mold was coated with a mold-release agent, Dow Corning 20[5], as a 10–25% solution in toluene. The mold was filled with the pourable rubber composition containing the activated dithiocarbamate accelerator, and the assembly was placed in a circulating air oven maintained at 150° F. The rubber composition was cured or vulcanized by heating it for about 4 hours at 150° F. Because the plaster mold transmits heat slowly, the mold assembly was allowed to remain in the oven for a period of 6 to 16 hours to insure a satisfactory cure. A prolonged cure is not detrimental to the rubber stock. The mold was allowed to cool at room temperature before stripping the vulcanizate therefrom. Before the addition of the accelerator and vulcanization, the mixture had a viscosity of 35[6]. After curing the negative rubber mat exhibited a tensile strength of 131 p.s.i. (pounds per square inch), an elongation of 390% at break and a modulus of 37 p.s.i. at 200% elongation. The vulcanizate was pliable and resilient.

Example 2

The negative rubber mat of vulcanized depolymerized rubber of Example 1 was used repeatedly in the production of ethyl silicate-sand mold cores by the Shaw process. After continued use the mat remained pliable, resilient and dimensionally stable. Upon aging and repeated use, it did not crack, tear, check, become stiff, hard or distorted in shape, size or design.

Example 3

Several ethyl silicate-sand mold cores made in accordance with Example 2 were used in the production of a metal mold for use in the ultimate production of rubber tires. The mold exhibited a uniform, undistorted negative design of the original plaster models of the tread segments.

Example 4

Several rubber tires were produced by curing green tires in the mold of Example 3. After vulcanizing and cooling, the tire treads were exact rubber replicas of the plaster positive models utilized in accordance with Example 1 to make the tire mold. The tire treads were of uniform undistorted design.

---

[5] A polydimethyl siloxane resin.

[6] Time in minutes required for 20 grams of the liquid composition to flow by gravity through a 5/16 inch opening in the vertex of a conical cup.

Example 5

A weighed sample of a vulcanizate produced in accordance with Example 1 was immersed in an ethyl alcohol-ethyl silicate solution for 24 hours and subsequently dried for 24 hours at 65° C. A weight loss of less than 1% was obtained after four such cycles.

Example 6

A weighed sample of Thiokol liquid polymer, cured by the addition of lead peroxide and stearic acid dispersed in a plasticizer of dioctyl phthalate, was immersed in an ethyl alcohol-ethyl silicate solution for 24 hours an subsequently dried for 24 hours at 65° C. A weight loss of 29.1% was obtained after four cycles.

Example 7

Example 6 was repeated without the addition of a plasticizer. A weight loss of 23.7% was suffered by the Thiokol polymer composition after four cycles. Thus it is obvious that the Thiokol polymer itself is excessively extracted by an ethyl silicate-alcohol solution.

Example 8

A sample of a vinyl plastisol composition sold under the trade name Koroseal #74 containing dioctyl phthalate and tricresyl phosphate as plasticizers was immersed in ethyl alcohol for 24 hours and subsequently dried 24 hours at 65° C. The Koroseal sample suffered a weight loss of 24.25%. It had become appreciably harder and had lost much of its original flexibility and resiliency. The sample exhibited a tendency to crack or check when distorted.

Example 9

Example 1 was repeated using 10 parts Hi-Sil in place of the 40 parts carbon black. The mixed recipe, prior to the addition of the accelerator and vulcanization, exhibited a viscosity of 33. Upon curing, the vulcanizate had a tensile strength of 75 p.s.i., an elongation of 300% at break, and a modulus of 25 p.s.i. at 200% elongation.

Examples 10–13

Examples 2, 3 and 4 were repeated using the vulcanized depolymerized rubber negative mat of Example 9. The results obtained were much superior to those obtained in the use of plastisol and Thiokol polymer mats.

Example 14

Example 9 was repeated increasing the amount of Hi-Sil employed to 20 parts. The vulcanized flexible mat thus formed possessed a tensile strength of 100 p.s.i., an elongation at break of 320% and a modulus of 50 p.s.i. at 200% elongation. These qualities compare favorably with those of the vulcanizate of Examples 1 and 9, which were found very satisfactory in the production of resilient, dimensionally stable mats. However, the mix prior to the addition of accelerator and vulcanization, exhibited a viscosity of 428, which made it less desirable for preparation of molds having intricate patterns.

Example 15

Example 1 was repeated, increasing the amount of carbon black used from 40 to 60 parts. The resultant vulcanizate had a tensile strength of 106 p.s.i., an elongation at break of 400% and a modulus of 44 p.s.i. at 200% elongation. Thus, the modulus and elongation properties of this vulcanizate were slightly superior to those of Example 1, while its tensile strength lay between that of the vulcanizate of Examples 1 and 9, both of which proved very satisfactory when the mats were employed in the Shaw process. Prior to addition of the accelerator, the pourable mix of this example exhibited a viscosity of 49 which, though higher than that of Example 1, is sufficiently low for satisfactory use in the production of intricate molds.

Example 16

Example 1 was again repeated, increasing the amount of accelerator to eight parts. The vulcanizate produced according to this recipe possessed a tensile strength of 150 p.s.i., a modulus of 50 at 200% elongation, and an elongation at break of 290%. Thus the modulus and tensile strength of this vulcanizate were superior to that of Example 1 and its elongation value comparable to that of Example 9.

From the foregoing examples, it is evident that an intermediate mat comprising a vulcanized depolymerized rubber composition is markedly superior to the prior art intermediate mats heretofore employed in the Shaw process. When prepared in accordance with this invention, the depolymerized rubber intermediate mat is pliable, resilient and capable of repeated use in the production of additional models or of metal molds, which faithfully reproduce the original design.

The viscosity of the pourable depolymerized rubber composition of the invention becomes lower as the composition is heated at the beginning of the curing step, thereby insuring the faithful reproduction of fine detail in the model; as heating continues the composition vulcanizes within a few hours to a set condition, retaining the detailed pattern of the model in permanent form. In contrast, the prior art Thiokol polymer compositions do not thin out after contact with a model but gradually air cure to a set condition after several days at room temperature. The viscosity range of the pourable composition of the invention, as measured by the method of Example 1, is from about 10 to about 450, and preferably from about 15 to 100; this measurement applies to the composition before admixture with accelerator and/or activator or to the composition immediately after such admixture and prior to vulcanization.

A porous model should be sealed before contact with the pourable rubber composition. Silicone resin solutions have proven satisfactory. Molds must be sealed and coated with a release agent, for example as indicated in Example 1, if a loose mat is required. The rubber mat should be anchored to the mold when this technique will produce satisfactory casts, since the accuracy of successive casts will be maintained for a greater period of time by this method; in such event right mold anchors should be provided before the liquid rubber composition is poured into the mold, in the manner known to those skilled in the art of manufacturing molds.

In the production of a rubber mat in accordance with the invention a model is assembled with a shell (or mold) to produce a mold assembly, and the liquid rubber composition is poured into the space between the shell and the model. In filling the mold assembly care is taken to eliminate any air which may become trapped therein, thus assuring intimate contact between the depolymerized rubber composition and the face of the model. It may be advantageous to introduce the liquid rubber composition under pressure while pulling a vacuum through the mold. An extremely intricate molded design may advantageously be coated with the liquid rubber composition prior to assembling the mold.

Vulcanization desirably will be effected by placing the mold assembly containing the depolymerized rubber composition into an oven maintained at 100–200° F. for a period between about one and about 24 hours. When a plaster model is utilized, it is wise to avoid temperatures in excess of about 150° F. As indicated in the examples the curing temperature is preferably maintained at about 150° F. for a period of about 4 to 20 hours for compositions equivalent in curing properties to the composition of Example 1. When such depolymerized rubber compositions are heated to conventional rubber curing temperatures, such as 260° F. and above, they tend to blow, become tacky on the surface and shrink upon cooling.

Since various modifications of the invention as described will occur to those skilled in the art, it is intended that its scope be limited only by the claims appended hereto.

What is claimed is:

1. A method of making a pliable, resilient, dimensionally stable mat structure suitable for repeated use in the production of models and mold cores, which comprises forming a model of the required configuration; separately forming a pourable liquid composition comprising depolymerized rubber of 5,000 to 11,000 molecular weight, a vulcanizing agent and an activated dithiocarbamate accelerator, the composition being characterized by a viscosity at room temperature of from 10 to 450, which is the time in minutes required for 20 grams of the liquid composition to flow by gravity through a 5/16 inch opening in the vertex of a conical cup; pouring said composition about said model at room temperature; and then vulcanizing said composition in contact with said model by heating the composition for one to 24 hours at 100 to 200° F. to form a vulcanized rubber mat.

2. A method of making a pliable, resilient, dimensionally stable mat structure suitable for repeated use in the production of models and mold cores, which comprises forming a pourable liquid composition comprising essentially depolymerized rubber of 5,000 to 11,000 molecular weight, with relatively smaller amounts of a vulcanizing agent and an activated dithiocarbamate accelerator, the composition being characterized by a viscosity at room temperature of from 10 to 450, which is the time in minutes required for 20 grams of the liquid composition to flow by gravity through a 5/16 inch opening in the vertex of a conical cup; pouring said composition at a temperature in the range of room temperature to 200° F., about a model of the desired configuration; and then vulcanizing said composition in contact with said model by heating the composition for one to 24 hours at 100 to 200° F. to form a vulcanized rubber mat.

3. A method of making a pliable, resilient, dimensionally stable mat structure suitable for repeated use in the production of models and mold cores, which comprises forming a pourable composition comprising 100 parts by weight of depolymerized rubber of 5,000 to 11,000 molecular weight, 0.5 to 10 parts of a vulcanizing agent therefor, one to 20 parts of a metallic oxide and 5 to 75 parts of a semi-reinforcing agent, the composition being characterized by a viscosity at room temperature of from 10 to 450, which is the time in minutes required for 20 grams of the liquid composition to flow by gravity through a 5/16 inch opening in the vertex of a conical cup; mixing said composition with one to 8 parts of an activated dithiocarbamate accelerator; then pouring the composition at room temperature about a model of the desired configuration; and thereafter vulcanizing said composition in contact with said model by heating the composition for one to 24 hours at 100 to 200° F. to form a vulcanized rubber mat.

4. The method of claim 3 wherein the vulcanizing agent is sulfur.

5. The method of claim 3 wherein the semi-reinforcing agent is carbon black.

6. The method of claim 3 wherein the semi-reinforcing agent is a hydrated silicon dioxide.

7. A flexible, resilient, dimensionally stable negative mat suitable for repeated use in the production of models and mold cores, said mat having been produced by the method of claim 2.

8. Method of making a model from an existing mat structure, comprising molding a model-casting-composition against a flexible negative mat produced by the method of claim 2, and removing the mat from contact with the so-molded model.

References Cited in the file of this patent

UNITED STATES PATENTS

| | | |
|---|---|---|
| 1,007,434 | Destribats | Oct. 31, 1911 |
| 1,599,534 | Kerley | Sept. 14, 1926 |
| 1,941,691 | Jenness | Jan. 2, 1934 |
| 2,019,207 | Alexander | Oct. 29, 1935 |
| 2,263,001 | Gunsaulus et al. | Nov. 18, 1941 |
| 2,349,549 | Hardman et al. | May 23, 1944 |
| 2,415,028 | Bosomworth et al. | Jan. 28, 1947 |
| 2,444,903 | Van Buren | July 6, 1948 |
| 2,560,052 | Miller et al. | July 10, 1951 |
| 2,704,752 | Mathes et al. | Mar. 22, 1955 |
| 2,713,572 | Hall | July 19, 1955 |
| 2,831,823 | Murray | Apr. 22, 1958 |
| 2,888,443 | Hayes | May 26, 1959 |